United States Patent [19]
Ichiki et al.

[11] Patent Number: 5,840,649
[45] Date of Patent: Nov. 24, 1998

[54] NOX ADSORBENTS

[75] Inventors: Masayoshi Ichiki, Osaka; Yuki Sairyo, Suita; Kazuhiro Kondo, Amagasaki; Atsushi Fukuju, Toyonaka, all of Japan

[73] Assignee: Hitachi Zosen Corporation, Osaka, Japan

[21] Appl. No.: 588,882

[22] Filed: Jan. 19, 1996

[30] Foreign Application Priority Data

| Jan. 20, 1995 | [JP] | Japan | 7-007180 |
| Jan. 20, 1995 | [JP] | Japan | 7-007181 |
| Jan. 20, 1995 | [JP] | Japan | 7-007182 |

[51] Int. Cl.⁶ .......................... B01J 23/32; B01J 23/40; B01J 8/00
[52] U.S. Cl. .......................... 502/324; 502/304; 502/309; 502/325; 502/326; 423/239.1; 423/213.2
[58] Field of Search .......................... 502/324, 309, 502/304, 325, 326; 423/239.1, 213.2

[56] References Cited

U.S. PATENT DOCUMENTS

| 4,814,153 | 3/1989 | Kobayashi et al. | 423/213.2 |
| 4,929,586 | 5/1990 | Hegedus et al. | 502/217 |
| 5,055,442 | 10/1991 | Osaka et al. | 502/439 |
| 5,413,771 | 5/1995 | Ziebarth et al. | 23/239.1 |
| 5,439,868 | 8/1995 | Onitsuka et al. | 502/413 |

FOREIGN PATENT DOCUMENTS 0 540 428   5/1993   European Pat. Off. .

OTHER PUBLICATIONS

European Search Report dated Apr. 18, 1996; Ref. No. 14–123 Me/ja; Application No. 96100643.4 listing above cited reference.

*Primary Examiner*—Mark L. Bell
*Assistant Examiner*—Patricia L. Hailey
*Attorney, Agent, or Firm*—Armstrong, Westerman, Hattori, McLeland & Naughton

[57] ABSTRACT

The present invention relates to a Mn-added titania carrier obtained by adding a Mn salt to amorphous titania and baking the titania. The invention also relates to an NOx adsorbent comprising the above-mentioned titania carrier and adsorbing components comprising oxides of Ru and/or Ce supported on the carrier. The invention also relates to an NOx adsorbent comprising the above-mentioned titania carrier and adsorbing components comprising oxides of Ru and/or Ce and an oxide of at least one metal among Ag, Cu and Mn supported on the carrier. The NOx adsorbents embodying the invention are effectively used for efficiently adsorbing and removing NOx from gases which contain much moisture and low-concentration, for example, a few ppm NOx such as gases discharged by ventilation from highway tunnels.

33 Claims, 3 Drawing Sheets

Number of Repeating Temperature Rise and Temperature Drop (-)

NOX ADSORBENTS

BACKGROUND OF THE INVENTION

1. Field of the Invention

The present invention relates to adsorbents for efficiently adsorbing and removing nitrogen oxides (NOx) from gases which contain much moisture and low-concentration, for example, a few ppm NOx such as gases discharged by ventilation from highway tunnels.

The invention also relates to inorganic porous solid acid carriers which comprise Mn added to titania. For example, these carriers are suitably used for constituting the above-mentioned NOx adsorbents.

2. Description of the Related Art

Known NOx adsorbents are those obtained by supporting oxides of metals such as Ru and Ce on anatase-type titania and baking the titania, those obtained by supporting oxides of metals such as Ru and Ce on a carrier such as zeolite and silica-alumina and baking the carrier in the same manner, etc.

The adsorbent comprising titania as a carrier has a defect in thermal resistance, for example, NOx adsorbing performance falls rapidly by heating at 400° C. in air. The NOx adsorbing performance falls, although slowly, even by heating at 300° C., which leads to problems in practice, considering that heating at around 250° C. is necessary to regenerate the adsorbent.

On the other hand, the adsorbent comprising Al—Si system compound oxides such as silica-alumina and zeolite as a carrier has sufficient thermal resistance, and the drop in NOx adsorbing performance is not observed even by heating at about 400° C. However, this adsorbent is not good in acid resistance, and the adsorbing performance falls by repeating adsorption and desorption of NOx.

Since high silica zeolite which is considered to be satisfactory in acid resistance has a very small pore diameter of less than 5 angstrom, the zeolite has a problem that pores are blocked in supporting compounds of Ru and/or Ce thereon by impregnation and that sufficient NOx adsorbing performance can not be obtained.

In addition, since the limit of NOx adsorbing performance, expressed in the volume of gases per the weight of the adsorbent, is up to about 2–3 ml/g in the initial performance, it is necessary to regenerate the adsorbent frequently.

The first object of the invention is to provide an NOx adsorbent which is excellent in thermal resistance and acid resistance and can exhibit a high adsorbing performance.

The second object of the invention is to provide an NOx adsorbent which exhibits high thermal resistance and acid resistance and does not exhibit an impaired adsorbing performance by repeating adsorption and desorption of NOx.

Silica-alumina, which is a compound oxide consisting of the combination of silica being a stable tetravalent oxide, and alumina being a trivalent oxide, zeolite, which is a special crystal consisting of the combination of silica and alumina, etc. are known to exhibit strong solid acidity. These are usually used as inorganic porous solid acid carriers by granulating powders and also used as catalysts, adsorbents, etc. by adsorbing and supporting transition metals, noble metals, etc. on acid sites.

Aluminium oxide in these carriers is relatively apt to be eroded by acids or alkalis, the crystal structures of the carriers often change, and the acid sites often disappear while the carriers are used, so that the carriers exhibit impaired catalytic performance, etc. In particular, the impaired performance leads to problems when these carriers are used in a liquid phase system which has pH of lower than 4 or higher than 10 or in a gaseous phase system which contains acidic gases such as SOx, NOx and $Cl_2$.

Still another object of the invention is to provide a titania carrier which can retain an excellent catalytic performance without permitting the change in crystal structure of the carrier and the loss of the acid sites when the carrier is used.

SUMMARY OF THE INVENTION

The first aspect of the invention is to provide an NOx adsorbent comprising adsorbing components supported on a titania carrier wherein the carrier is a Mn—Ti system surface-reformed titania carrier obtained by adding a Mn compound to amorphous titania and baking the titania and the adsorbing components are oxides of Ru and/or Ce. (Such NOx adsorbent is hereinafter referred to as the "first NOx adsorbent".)

The second aspect of the invention is to provide an NOx adsorbent comprising adsorbing components supported on the titania carrier wherein the carrier is the Mn—Ti system surface-reformed titania carrier obtained by adding a Mn compound to amorphous titania and baking the titania and the adsorbing components are oxides of Ru and Ce, and an oxide of at least one metal among Ag, Cu and Mn. (Such NOx adsorbent is hereinafter referred to as the "second NOx adsorbent".)

The third aspect of the invention is to provide a Mn-added titania carrier obtained by adding a Mn salt to amorphous titania and baking the titania. The titania carrier is produced, for example, by impregnating a substance obtained by evaporating a titania colloidal solution to dryness with a manganese salt solution and baking the substance.

DETAILED DESCRIPTION OF THE INVENTION

Figure 1:
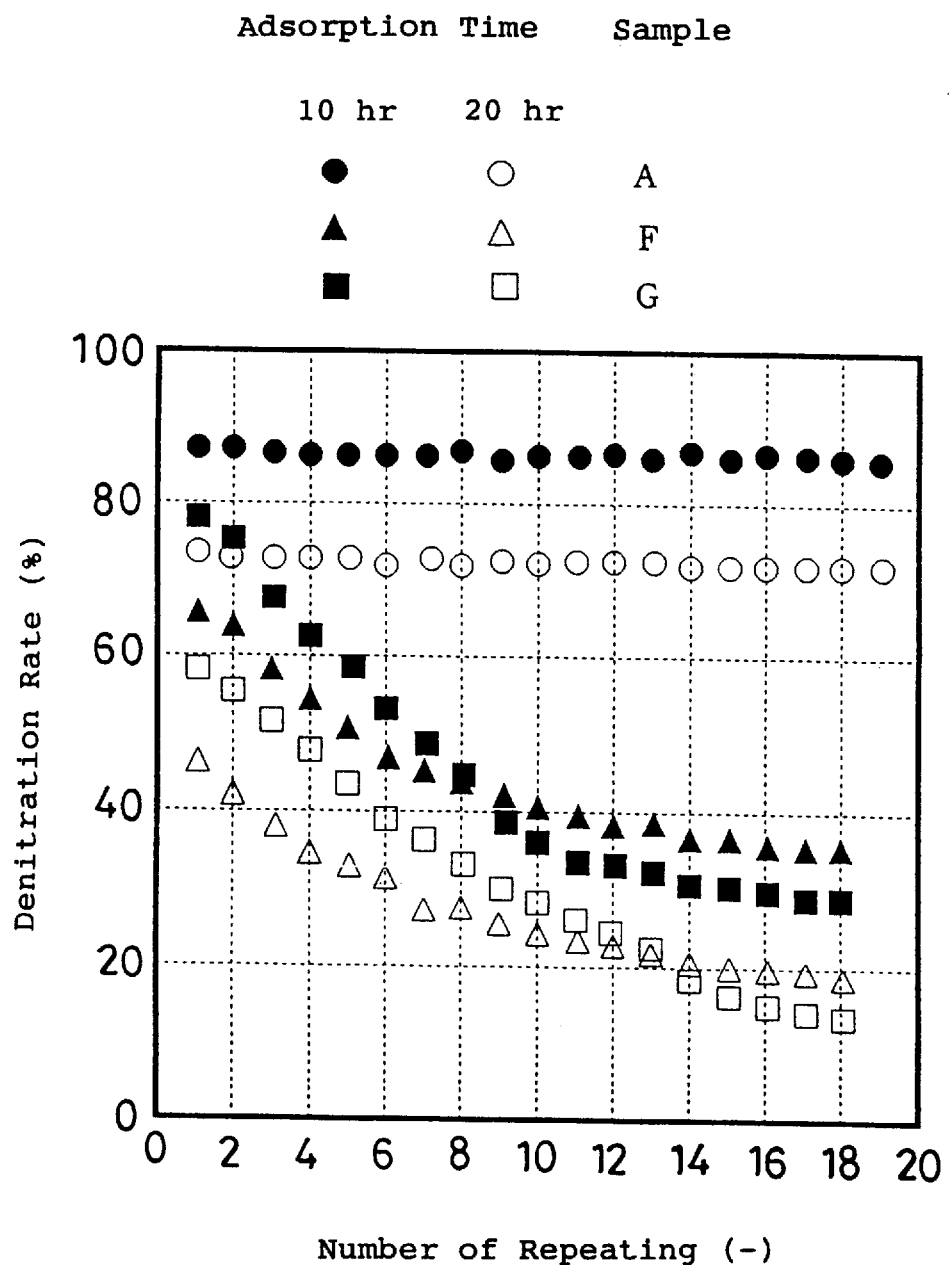
FIG. 1 is a graph showing relations between the number of repeating adsorption and desorption of NOx and the denitration rate.

In the first NOx adsorbent of the invention wherein the carrier is the Mn—Ti system surface-reformed titania carrier obtained by adding the Mn compound to amorphous titania and baking the titania and the adsorbing components are oxides of Ru and/or Ce, amorphous titania can be a plate obtained, for example, by impregnating an incombustible fibrous preform with a titania colloidal solution and drying the preform. The amount of amorphous titania retained in this plate is preferably 60–95% by weight, more preferably 75–85% by weight.

In the first NOx adsorbent, the Mn content is preferably 0.01–3.0 mmol/g $TiO_2$, more preferably 0.5–2.5 mmol/g $TiO_2$, most preferably 0.6–2.0 mmol/g $TiO_2$, the Ru content is preferably more than 0.05 mmol/g $TiO_2$, more preferably 0.05–2.0 mmol/g $TiO_2$, most preferably 0.1–0.2 mmol/g $TiO_2$, and the Ce content is preferably more than 1.0 mmol/g $TiO_2$, more preferably 1.0–10 mmol/g $TiO_2$most preferably 1.5–2.5 mmol/g $TiO_2$. The specific surface area of the carrier is preferably 40–200 $m^2/g$, more preferably 70–140 $m^2/g$, and the specific surface area of the NOx adsorbent is preferably 40–200 $m^2/g$, more preferably 70–140 $m^2/g$.

Amorphous titania constituting the carrier is obtained, for example, by drying a titania colloidal solution obtained by the nitrate hydrolysis method.

In the first NOx adsorbent, the carrier may be a metal-Ti system surface-reformed titania carrier obtained by adding the Mn compound and/or the second compound of at least one metal selected from the group consisting of Cu, Fe, Ni and Sn to amorphous titania and baking the titania.

The first NOx adsorbent is preferably prepared, for example, by impregnating amorphous titania with a solution of a manganese compound, baking the titania, and supporting the oxides of Ru and/or Ce on the obtained Mn—Ti system surface-reformed titania carrier. Amorphous titania used in this process can be also a plate obtained by impregnating the incombustible fibrous preform with the titania colloidal solution and drying the preform.

To impregnate amorphous titania with the solution of the manganese compound in the above-mentioned process, amorphous titania is immersed in a Mn solution containing preferably 0.2–5.0 mol/l, more preferably 0.5–1.5 mol/l of a manganese compound such as chloride, nitrate, salt of organic acid and alkali manganate, then the titania is baked preferably at 250°–600° C., more preferably at 350°–600°0 C., most preferably at 380°–450° C.

To support the oxides of Ru and/or Ce on the above-mentioned carrier, amorphous titania is immersed in a Ru solution containing preferably 0.05–0.2 mol/l, more preferably 0.1–0.15 mol/l of a ruthenium compound such as chloride, nitrate, carbonyl compound and organic alcoholate, the titania is baked preferably at 250°–380° C. more preferably at 300°–350° C., and/or the amorphous titania is immersed in a Ce solution containing preferably 1.5 mol/l-saturated concentration, more preferably 2.5–2.8 mol/l of a cerium compound such as chloride and nitrate, then the titania is baked preferably at 250°–380° C., more preferably at 300°–350° C. Ruthenium and cerium may be supported in turn using an immersion bath containing the ruthenium compound and an immersion bath containing the cerium compound and may be supported at the same time using one immersion bath containing both the ruthenium compound and the cerium compound.

Manganese nitrate, ruthenium chloride and cerium nitrate are preferable as the manganese compound, ruthenium compound and cerium compound respectively.

In the second NOx adsorbent of the invention wherein the carrier is the Mn—Ti system surface-reformed titania carrier obtained by adding the Mn compound to amorphous titania and baking the titania and the adsorbing components are oxides of Ru and Ce, and an oxide of at least one metal among Ag, Cu and Mn, amorphous titania can be a plate obtained, for example, by impregnating the incombustible fibrous preform with the titania colloidal solution and drying the preform. The amount of amorphous titania retained in this plate is 60–95% by weight, preferably 75–85% by weight.

In the second NOx adsorbent, the Mn content is preferably 0.01–3.0 mmol/g $TiO_2$,more preferably 0.5–2.5 mmol/g $TiO_2$, most preferably 0.6–2.0 mmol/g TiO the Ru content is preferably more than 0.05 mmol/g $TiO_2$, more preferably 0.05–2.0 mmol/g $TiO_2$, most preferably 0.1–0.2 mmol/g $TiO_2$, and the Ce content is preferably more than 1.0 mmol/g $TiO_2$, more preferably 1.0–10 mmol/g $TiO_2$, most preferably 1.5–2.5 mmol/g $TiO_2$. The content of at least one metal among Ag, Cu and Mn is preferably 0.1–5.0 mmol/g $TiO_2$, more preferably 0.3–2.5 mmol/g $TiO_2$. The specific surface area of the carrier is preferably 40–200 $m^2/g$, more preferably 70–140 $m^2/g$, and the specific surface area of the NOx adsorbent is preferably 40–200 $m^2/g$, more preferably 70–140 $m^2/g$.

In the second NOx adsorbent, the carrier may be a metal-Ti system surface-reformed titania carrier obtained by adding the Mn compound and/or the second compound of at least one metal selected from the group consisting of Cu, Fe, Ni and Sn to amorphous titania and baking the titania.

The second NOx adsorbent is preferably prepared, for example, by impregnating amorphous titania with a solution of the manganese compound, baking the titania, impregnating the obtained Mn—Ti system surface-reformed titania carrier with the solution of the oxides of Ru and Ce, and the oxide of at least one metal among Ag, Cu and Mn, and baking the carrier. Amorphous titania used in this process can be also a plate obtained by impregnating the incombustible fibrous preform with the titania colloidal solution and drying the preform.

To impregnate amorphous titania with the solution of the manganese compound in the above-mentioned process, amorphous titania is immersed in the Mn solution containing preferably 0.2–5.0 mol/l, more preferably 0.5–1.5 mol/l of the manganese compound such as chloride, nitrate, salt of organic acid and alkali manganate, then the titania is baked preferably at 250°–600° C., more preferably at 350°–600° C., most preferably at 380°–450° C.

To support Ru oxide, Ce oxide and the oxide of at least one metal among Ag, Cu and Mn on the above-mentioned carrier, amorphous titania is immersed in the Ru solution containing preferably 0.05–0.2 mol/l, more preferably 0.1–0.15 mol/l of the ruthenium compound such as chloride, nitrate, carbonyl compound and organic alcoholate, the titania is baked preferably at 250°–380° C., more preferably at 300°–350° C., the amorphous titania is immersed in the Ce solution containing preferably 1.5 mol/l-saturated concentration, more preferably 2.5–2.8 mol/l of the cerium compound such as chloride and nitrate, the titania is baked preferably at 250°–380° C., more preferably at 300°–350° C., the amorphous titania is immersed in a metal solution containing preferably 0.3–1.5 mol/l, more preferably 0.5–1.5 mol/l of a metal compound such as nitrate, salt of organic acid and chloride (only Cu and Mn) of at least one among Ag, Cu and Mn, then the titania is baked preferably at 250°–380° C., more preferably at 300°–350° C.

Ruthenium, cerium and at least one metal among Ag, Cu and Mn may be supported in turn using an immersion bath containing the ruthenium compound, an immersion bath containing the cerium compound and the immersion bath containing at least one metal among Ag, Cu and Mn, and may be supported at the same time using one immersion bath containing the ruthenium compound, the cerium compound and the compound of at least one metal among Ag, Cu and Mn together.

Manganese nitrate, ruthenium chloride and cerium nitrate are preferable as the manganese compound, ruthenium compound and cerium compound respectively, and nitrates are preferable as the compound of at least one metal among Ag, Cu and Mn.

Thermal resistance of the NOx adsorbent comprising the oxides of Ru and/or Ce as adsorbing components can be improved by:

i) adsorbing and supporting Ru ion or Ru complex ion on the acid sites of the carrier solid acid, ii) baking the carrier at relatively low temperatures, iii) covering the residual acid sites with Ce ion or Ce complex ion, and iv) arranging the excess Ce around Ru and baking the carrier.

High acid strength of the carrier solid acid makes thermal resistance higher.

The Al—Si system compound oxide known as a strong solid acid carrier has high thermal resistance as stated above. However, the acid sites disappear, because this oxide is not good in acid resistance and Al component in the Si skeleton which is responsible for exhibiting solid acidity repeats formation of nitrate or nitrite and thermal decomposition and is separated from the skeleton by repeating adsorption and desorption of NOx when the adsorbent is used. As a result, thermal resistance of the adsorbent disappears and the performance of the adsorbent falls remarkably when the adsorbent is heated and regenerated.

It is preferable to use a carrier exhibiting strong solid acidity and high acid resistance in order to prevent this phenomenon.

The first NOx adsorbent was prepared by supporting the oxides of Ru and/or Ce as adsorbing component on the surface-reformed titania carrier prepared by adding the Mn salt on amorphous titania and baking the titania. This NOx adsorbent exhibits high thermal resistance and does not exhibit an impaired adsorbing performance at all by adsorption and desorption of NOx.

Examining the NOx adsorbing performance in more detail, the inventors found that NOx in gaseous phase is first adsorbed on Ru oxide, migrates on the solid surface to Ce oxide, and is fixed there.

The NOx fixation by Ce presumably accompanies the following reactions.

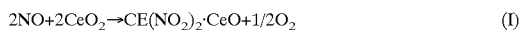

$$2NO + 2CeO_2 \rightarrow Ce(NO_2)_2 \cdot CeO + 1/2 O_2 \quad (I)$$

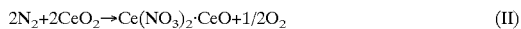

$$2N_2 + 2CeO_2 \rightarrow Ce(NO_3)_2 \cdot CeO + 1/2 O_2 \quad (II)$$

The existence of tetravalent Ce oxide is necessary to promote the above-mentioned reactions smoothly. Since Cl ion cannot be removed completely by baking below 350° C., using cerium chloride as a starting material of Ce, the NOx fixing capacity is sometimes low. Baking is performed at higher temperatures to remove Cl ion completely. However, it is feared that the adsorbing performance falls remarkably by thermal change of Ru oxide already supported on the carrier, if baking is performed at high temperatures.

Accordingly, it is preferable to use a nitrate as the starting material of Ce and to convert Ce into tetravalent Ce oxide almost completely by baking below 350° C.

In heating the adsorbent to eliminate NOx and to regenerate the adsorbent, it is postulated that reverse reactions of the above-mentioned reactions shown in the formulas (I) and (II) proceed. Namely, it is thought that Ce fixing NOx is divalent Ce oxide and that this oxide is reoxidized to tetravalent Ce oxide when NOx is eliminated. It is preferable to add a substance exhibiting strong oxidative catalytic action over 200° C. to the surface of Ce oxide in order to promote this reoxidation smoothly.

The inventors found that it is effective to add the oxides of Ag, Cu and/or Mn as such substances and completed the second NOx adsorbent.

As starting materials of the oxides of Ag, Cu and/or Mn, nitrates of respective metals are preferable, since the nitrates do not change the structure of tetravalent Ce oxide supported already. However, supporting the metals at the same time by using a mixed solution of Ce nitrate and the nitrates of Ag, Cu and/or Mn, the probability of the existence of Ce oxide around Ru oxide falls. This phenomenon hinders the migration of NOx on the surface of the adsorbent from Ru to Ce, so that the adsorbing performance sometimes falls. Accordingly, it is preferable to add Ag, Cu and/or Mn after supporting Ce and baking the carrier.

The titania carrier according to the third aspect of the invention obtained by adding the Mn salt to amorphous titania and baking the titania is prepared by impregnating a substance obtained by evaporating the titania colloidal solution to dryness with a solution of a manganese salt and baking the substance.

The above-mentioned amorphous titania can be a plate solid acid carrier obtained, for example, by impregnating the incombustible fibrous preform with the titania colloidal solution and drying the preform. The amount of amorphous titania retained in this plate is 60–95% by weight, preferably 75–85% by weight.

The Mn content is preferably 0.01–3.0 mmol/g $TiO_2$, more preferably 0.5–2.5 mmol/g $TiO_2$, most preferably 0.6–2.0 mmol/g $TiO_2$. The specific surface area of the carrier is preferably 40–200 $m^2/g$, more preferably 70–140 $m^2/g$.

The manganese salt added to amorphous titania is pyrolytically decomposed to oxide and amorphous titania is crystallized at the same time by baking in the above-mentioned process for preparation.

Titania colloidal particles are used as a starting material of amorphous titania. According to the preferable mode of preparation, the desired carrier is obtained by evaporating the titania colloidal solution to dryness below 200° C., preferably below 150° C., impregnating the obtained titania with the solution of the Mn salt, and baking the titania.

Chloride, nitrate, salt of organic acid, alkali manganate, etc. can be generally used as the Mn salt. A preferred manganese compound is nitrate for the following reasons: 1) a decomposition temperature is low, 2) secondary phenomenon such as combustion does not occur during decomposition, 3) an operation of removing alkali metal is unnecessary after baking, etc. In using nitrate, the Mn salt can be decomposed by heating in air over 300° C.

The crystallization of titania to anatase-type proceeds remarkably over 350° C. and the transformation to rutile-type proceeds remarkably over 600° C. Accordingly, to impregnate amorphous titania with the solution of the manganese compound in the above-mentioned process, amorphous titania is immersed in the preferably 0.2–5.0 mol/l, more preferably 0.5–1.5 mol/l aqueous solution of nitrate, then the titania is baked preferably at 250°–600° C., more preferably at 350°–600° C., most preferably at 380°–450° C. Manganese nitrate is preferable as the manganese compound.

It is understood that the strong solid acidity is exhibited, for example, as a result of heterogeneous electron energy density in the solid (crystal) by the compound of tetravalent Si and trivalent Al as oxides.

According to the invention, a solid acid carrier which exhibits high acid resistance and alkali resistance can be provided by using Mn, which has relatively low reactivity with acids and alkalis and can exhibit various oxidation number such as 2, 3, 4 and 7, instead of Al, which is responsible for low acid resistance and alkali resistance in the conventional solid acid carriers, and by adopting Ti, whose stable tetravalent oxide similar to that of Si is apt to form a compound oxide with Mn, instead of Si.

Since tetravalent Mn oxide has a characteristic of forming the compound with Ti oxide and changing the oxidation number easily even after forming the compound, the Mn oxide is a substance which is suitable for forming the solid acid carrier.

However, in using titania, the hydrothermal synthesis method which is used for synthesis of zeolite cannot be applied to form the compound of tetravalent Mn oxide and Ti oxide, so that it is necessary to bake mixed oxide of Ti and Mn or hydroxides of Ti and Mn at high temperatures. Unlike silica, titania changes its crystal form by heating over 600° C. and loses characteristics such as specific surface area and porosity required for the catalytic carrier.

The carrier of the invention is prepared by supporting the Mn salt on porous titania which exhibits no characteristic peak of the crystal by X-ray diffraction (XRD), thermally decomposing this salt by baking to form Mn oxide dispersed uniformly on the titania surface, crystallizing titania to anatase-type, which has a large specific surface area and high porosity, by further baking, and then forming the compound of Ti oxide and Mn oxide making use of the accompanying transfer of Ti atom. The carrier is considered to be a $TiO_2$-$MnO_2$ compound oxide which has a specific surface area of larger than 80 $m^2/g$.

Even if only the neighborhood of the surface of titania crystalline particles is compounded, the compound is sufficient for use of the catalytic carrier, etc. The solid part which is not compounded serves to retain mechanical strength, specific surface area, porosity of the carrier, etc.

EXAMPLES

The following examples illustrate the processes for preparation of the NOx adsorbents according to the invention and the characteristics of the obtained adsorbents.

Example 1

Ceramic paper having a thickness of 0.5 mm was impregnated with a titania colloidal solution (solid content: 32% by weight) obtained by the nitrate hydrolysis method and dried at 110° C. to obtain a plate retaining 158 $g/m^2$ of amorphous titania. This plate was immersed in a 1.0 mol/l aqueous solution of manganese nitrate for 6 minutes and dried at 110° C. By these operations, 1.1 mmol of Mn per 1 g of $TiO_2$ was added thereto. This plate was baked under air stream at 300° C. for 1 hour, then at 400° C. for 3 hours to obtain surface-reformed titania.

This carrier had a specific surface area of 91 $m^2/g$ $TiO_2$.

This plate carrier was immersed in an aqueous solution of $RuCl_3$ of 14 g/l calculated as Ru (pH=0.92) for 6 minutes, dried at 110° C., and then baked at 230° C. for 1 hour.

Then the above-mentioned plate carrier was immersed in an aqueous solution of $Ce(NO_3)_3$ of 250 g/l calculated as Ce for 12 minutes and baked at 350° C. for 3 hours. An NOx adsorbent supporting 0.16 mmol of Ru and 2.0 mmol of Ce per 1 g of $TiO_2$ was obtained by the above-mentioned operations. This adsorbent had a specific surface area of 77 $m^2/g$ $TiO_2$.

This adsorbent is hereinafter referred to as "sample A".

Examples 2–5

The same procedure as in Example 1 was repeated except that the Mn concentrations in the aqueous solutions of manganese nitrate were 0.5 mol/l, 1.0 mol/l, 1.5 mol/l and 2.0 mol/l respectively to obtain NOx adsorbents. These adsorbents are hereinafter respectively referred to as "sample B", "sample C", "sample D" and "sample E".

Comparative Example 1

The same procedure as in Example 1 was repeated using the amorphous titania-retaining plate prepared in the same manner as in Example 1 except that the plate was baked under the same condition as in Example 1 without adding Mn to obtain an NOx adsorbent. This adsorbent is hereinafter referred to as "sample F".

Comparative Example 2

The same ceramic paper as used in Example 1 was immersed in a colloidal solution (solid content: 21% by weight) of silica-alumina (Al/Si=3/7) and dried to obtain a plate retaining 110 $g/m^2$ of silica-alumina.

This plate was treated with a 1 mmol/l aqueous solution of ammonium chloride at 90° C. for 5 hours to remove an alkali, and then baked at 500° C. for 5 hours to obtain a silica-alumina system plate carrier. Ruthenium and cerium were supported thereon by the same treatment as in Example 1 to obtain a plate NOx adsorbent. This adsorbent is hereinafter referred to as "sample G".

Performance Test

The samples A–G prepared by the above-mentioned procedures were checked for composition, specific surface area, saturated amount of NOx adsorbed in air (room temperature, relative humidity: 70%) atmosphere containing 100 ppm of NO, and saturated amounts of NOx adsorbed after baking the samples in air at 400° C. for additional 12 hours or 24 hours. The obtained measurements are shown in Table 1.

TABLE 1

| sample | component (mmol/gTiO$_2$) | | | specific surface area (m$^2$/gTiO$_2$) | saturated amount of adsorption(cc/m$^2$) | | |
|---|---|---|---|---|---|---|---|
| | Mn | Ru | Ce | | initial | 12 hr heating | 24 hr heating |
| A | 1.1 | 0.16 | 2.0 | 77.0 | 930 | 790 | 690 |
| B | 0.6 | 0.13 | 2.1 | 79.2 | 880 | 550 | 485 |
| C | 1.5 | 0.17 | 2.0 | 75.5 | 900 | 780 | 680 |
| D | 1.8 | 0.15 | 1.8 | 78.0 | 910 | 780 | 660 |
| E | 2.0 | 0.13 | 1.6 | 71.1 | 850 | 650 | 620 |
| F | — | 0.18 | 2.0 | 85.8 | 550 | 120 | 30 |
| G | — | 0.17 | 2.1 | 135 | 620 | 625 | 600 |

Table 1 reveals the following matters. The amounts of Ru and Ce supported do not change very much even if the amount of Mn added is changed. Since the initial saturated amount of NOx adsorbed is almost determined by the amounts of Ru and Ce supported, significant differences in the initial saturated amount of NOx adsorbed are not observed among the samples A–E. However, the sample F comprising no Ru added clearly exhibits lower initial saturated amount of NOx adsorbed than the other samples. This result reveals that heat deterioration proceeds to some extent by baking after supporting Ce.

The sample F exhibited a very marked variation in performance by heating at 400° C. The differences among the samples A–E can be regarded as differences in amount of acid of strong solid acid exhibited in accordance with the differences in amount of Mn added. Namely, it is interpreted that the NOx adsorbing performance after heating is almost determined by the amount of Ru adsorbed at strong acid sites. It is thought that the amount of acid is insufficient for the amount of Ru supported in the sample B since the sample B comprises a little Mn added. It is thought that most of supported Ru is adsorbed at acid sites in the samples A, C, D and E.

The sample E comprises excess Mn added and exhibits a decreased specific surface area, a small amount of Ru and Ce supported, and low performance on the whole.

The sample G exhibits very high thermal resistance, but it exhibits a low initial performance, since the amount of carrier retained on the paper is less than that of the Mn-added carrier.

Repeat Test of Adsorption and Desorption of NOx

The samples A, F and G were checked by the repeat test of adsorption and desorption of NOx by the following procedure. These results are shown in FIG. 1.

The plate adsorbent was packed in an adsorption tube (30×30 mm square), room-temperature air (relative humidity: 70%) containing 4.5 ppm of NO was passed through the tube, checking the relations between the time from the beginning of the passage of air and the outlet NOx concentration. The air stream was replaced with clean air (relative humidity: 70%) after 21 hours, the adsorption tube was heated at the same time, and maintained at 260° C. for 1 hour to regenerate the adsorbent. These operations were repeated, observing the variations in NOx adsorbing performance.

Hereupon, (flow rate of air)/(geometric area of adsorbent)=6 $Nm^3/m^2$ (denitration rate)=1-(outlet NOx concentration)/(inlet NOx concentration)

The denitration rate was determined by the abovementioned equation. These results are shown in FIG. 1.

As apparent from FIG. 1, the sample A hardly exhibited a impaired performance by repeating adsorption and desorption of NOx, but the samples F and G exhibited markedly impaired performance in beginning the repetition then gradually impaired performance. In particular, the sample G having high thermal resistance exhibited a markedly impaired performance.

Example 6 a) Ceramic paper having a thickness of 0.5 mm was impregnated with a titania colloidal solution (solid content: 32% by weight) obtained by the nitrate hydrolysis method and dried at 110° C. to obtain a plate retaining 165 $g/m^2$ of amorphous titania. This plate was immersed in a 1.0 mol/l aqueous solution of manganese nitrate for 6 minutes and dried at 110° C. By these operations, 1.1 mmol of Mn per 1 g of $TiO_2$ was added thereto. This plate was baked under air stream at 300° C. for 1 hour, then at 400° C. for 3 hours to obtain surface-reformed titania.

This carrier had a specific surface area of 95 $m^2$/g $TiO_2$.

This plate carrier was immersed in an aqueous solution of $RuCl_3$ of 14 g/l calculated as Ru (pH=0.92) for 6 minutes, dried at 110° C., and then baked at 230° C. for 1 hour.

The above-mentioned plate carrier was immersed in an aqueous solution of $Ce(NO_3)_3$ of 250 g/l calculated as Ce for 12 minutes and baked at 350° C. for 3 hours. An NOx adsorbent supporting 0.16 mmol of Ru and 2.0 mmol of Ce per 1 g of $TiO_2$ was obtained by the above-mentioned operations. This adsorbent had a specific surface area of 77 $m^2$/g $TiO_2$.

This adsorbent is hereinafter referred to as "sample H".

b) Then four pieces of sample H were immersed in 0.5 mol/l, 1.0 mol/l, 1.5 mol/l and 2.0 mol/l aqueous solutions of copper nitrate for 12 minutes respectively, dried, and then baked at 350° C. for 1 hour to obtain NOx adsorbents. These adsorbents are hereinafter respectively referred to as "sample I", "sample J", "sample K" and "sample L".

Comparative Example 3

The same procedure as in the process a) of Example 6 was repeated using cerium chloride instead of cerium nitrate to obtain an NOx adsorbent supporting 0.13 mmol of Ru and 2.0 mmol of Ce per 1 g of $TiO_2$. This adsorbent is hereinafter referred to as "sample M".

Comparative Example 4

The sample F obtained in Comparative Example 3 was immersed in a 0.5 mol/l aqueous solution of copper nitrate for 12 minutes, dried, and then baked at 350° C. for 1 hour to obtain an NOx adsorbent. This adsorbent is hereinafter referred to as "sample N".

Example 7

The sample H obtained in Example 6 was immersed in a 0.5 mol/l aqueous solution of silver nitrate for 12 minutes, dried, and then baked at 350° C. for 1 hour to obtain an NOx adsorbent. This adsorbent is hereinafter referred to as "sample O".

Example 8

The sample H obtained in Example 6 was immersed in a 0.5 mol/l aqueous solution of manganese nitrate for 12 minutes, dried, and then baked at 350° C. for 1 hour to obtain an NOx adsorbent. This adsorbent is hereinafter referred to as "sample P".

Comparative Example 5

The sample H obtained in Example 6 was immersed in a mixed aqueous solution of 250 g/l of $Ce(NO_3)_3$ and 0.5 mol/l of copper nitrate for 12 minutes, dried, and then baked at 350° C. for 1 hour to obtain an NOx adsorbent. This adsorbent is hereinafter referred to as "sample Q".

Performance Test

The samples H–Q prepared by the above-mentioned procedures were checked for composition, specific surface area, saturated amount of NOx adsorbed in air (room temperature, relative humidity: 70%) atmosphere containing 100 ppm of NO, and saturated amount of NOx adsorbed after baking the samples in air at 400° C. for additional 12 hours or 24 hours. The obtained measurements are shown in Table 2.

TABLE 2

| | component (mmol/g$TiO_2$) | | | | specific surface area($m^2$/g$TiO_2$) | saturated amount of adsorption(cc/$m^2$) | | |
|---|---|---|---|---|---|---|---|---|
| sample | Mn | Ru | Ce | Me | | initial | 12 hr heating | 24 hr heating |
| H | 1.1 | 0.16 | 2.0 | — | 77.0 | 930 | 790 | 690 |
| I | 1.1 | 0.15 | 2.1 | 0.52 | 75.1 | 950 | 800 | 720 |
| J | 1.2 | 0.17 | 2.0 | 1.03 | 73.5 | 945 | 810 | 750 |
| K | 1.0 | 0.15 | 1.8 | 1.45 | 70.5 | 970 | 820 | 760 |
| L | 1.2 | 0.13 | 1.9 | 1.99 | 71.1 | 955 | 815 | 750 |
| M | 1.1 | 0.13 | 2.0 | — | 75.8 | 275 | 120 | 65 |
| N | 1.0 | 0.17 | 2.1 | 0.48 | 78.8 | 295 | 245 | 185 |
| O | 1.0 | 0.15 | 1.9 | 0.65 | 75.9 | 950 | 800 | 745 |
| P | 1.2 | 0.13 | 2.0 | 0.45 | 70.2 | 985 | 830 | 765 |
| Q | 1.1 | 0.16 | 1.8 | 0.48 | 75.9 | 260 | 100 | 55 |

"Me" represents Cu for the samples I–L, N and Q, Ag for the sample O, and Mn for the sample P.

Table 2 reveals the following matters. When nitrate is used as a starting material of Ce, adsorbing capacity increases more than threefold. In addition, the drop of adsorbing capacity by heating is depressed by adding Ag, Cu and/or Mn.

The sample Q exhibits a low adsorbing performance in spite of using cerium nitrate. It is interpreted that the probability of contact of Ru and Ce fell since mixed support of Ce ion and Cu ion was performed.

Example 9

The NOx adsorbents were obtained by the procedure under the same condition as in the preparation of sample J of Example 6 except that the concentration of cerium nitrate was changed, and checked for saturated amount of NOx adsorbed. These results are shown in FIG. 2.

Figure 2:
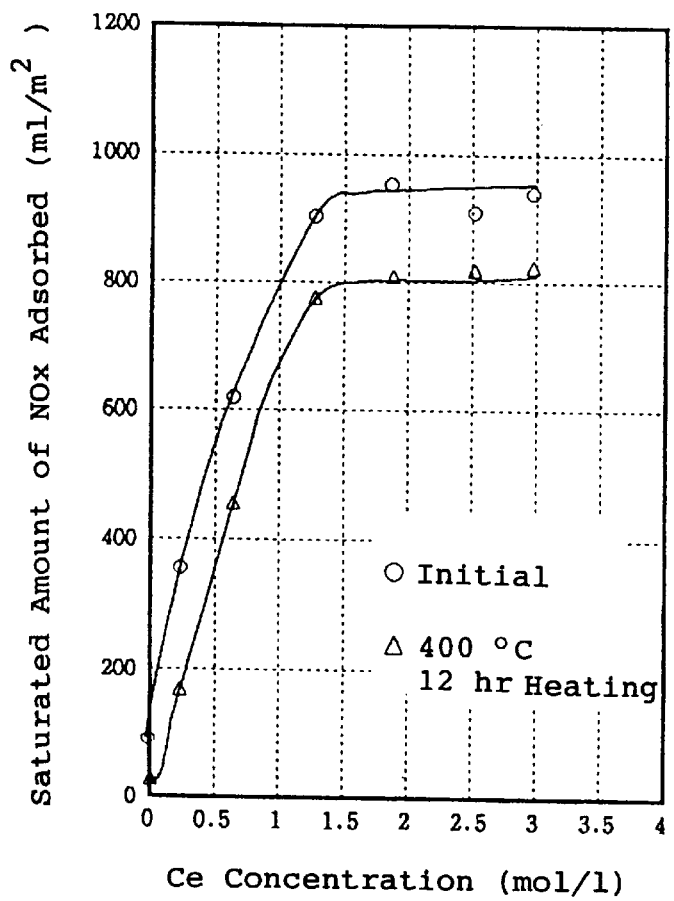
FIG. 2 is a graph showing relations between the cerium concentration in the immersion bath and the saturated amount of NOx adsorbed.

As apparent from FIG. 2, the amount of NOx adsorbed increases as the Ce concentration increases when the concentration of cerium nitrate is lower than about 1.3 mol/l. However, the amount of NOx adsorbed is almost constant when the concentration of cerium nitrate is about 1.3 mol/l to 3 mol/l which is almost saturated concentration at room temperature.

Example 10

The titania colloidal solution obtained by the nitrate hydrolysis process was evaporated to dryness to obtain powdered amorphous titania. One hundred grams of this powdered titania was introduced into 250 ml of 0.5 mol/l aqueous solution of manganese nitrate, stirred for 1 hour, filtered off, and washed once with pure water.

This washed product was dried at 110° C., and baked under air stream with a ventilating furnace at 300° C. for 1 hour, then at 430° C. for 3 hours. The obtained product is hereinafter referred to as "sample R".

Examples 11–13

The same procedure as in Example 10 was repeated except that the Mn concentrations in the aqueous solutions of manganese nitrate were 0.2 mol/l, 1.0 mol/l and 2.0 mol/l respectively. The obtained products are hereinafter respectively referred to as "sample S", "sample T" and "sample U".

Comparative Example 6

A product was obtained in the same manner as in Example 10 except that Mn was not added to titania. This product is hereinafter referred to as "sample V".

Comparative Example 7

The powder obtained by evaporating the titania colloidal solution to dryness was baked at 430° C. for 3 hours. Manganese was added to this powder under the same condition as in Example 10, and the powder was baked. This product is hereinafter referred to as "sample W".

Example 14

Ceramic paper having a thickness of 0.25 mm was immersed in a titania colloidal solution containing 31% of solid, dripped for 15 minutes, and then dried at 110° C. to obtain a plate retaining 190 g/m$^2$ (basis weight) of titania. This plate was immersed in a 0.5 mol/l aqueous solution of manganese nitrate for 1 hour under the condition of 6 liter/m$^2$, immersed once in pure water, washed once with pure water, dried, and then baked under air stream at 300° C. for 1 hour, then at 430° C. for 3 hours. The obtained plate is hereinafter referred to as "sample X".

Performance Test

The samples R–X were checked for specific surface area, amount of solid acid and solid acid strength. The samples R and W were also checked by the Mn elution test with a 0.1 mol/l aqueous solution of HCl. The sample X was also checked for decrease in amount of acid by repeating temperature rise and temperature drop in air (relative humidity: 70%) containing 1000 ppm of NO at room temperature –300° C.

The measurements of Mn content, specific surface area, acid strength and amount of acid are shown in Table 3.

TABLE 3

| sample | Mn content mmol/g | specific surface area m$^2$/g | maximum acid strength H$_0$ | amount of acid mmol/g |
|---|---|---|---|---|
| R | 0.05 | 105 | –5.6 | 0.04 |
| S | 0.02 | 115 | –5.6 | 0.02 |
| T | 0.11 | 93 | –5.6 | 0.095 |
| U | 0.19 | 90 | –5.6 | 0.14 |
| V | — | 120 | +1.5 | 0.01> |
| W | 0.04 | 95 | +1.5 | 0.015 |
| X | 0.035 | 83 | –5.6 | 0.03 |

Mn content: chemical analysis of samples specific surface area: N$_2$ adsorption method acid strength: infrared absorption method amount of acid: n-butylamine titration method As apparent from Table 3, the carriers of the invention exhibit strong acid sites having the amounts of acid according to the amounts of Mn added and retain large specific surface areas, since they are baked at relatively low temperature.

Elution Test

The samples R and W were checked by the Mn elution test by the following procedure.

Figure 3:
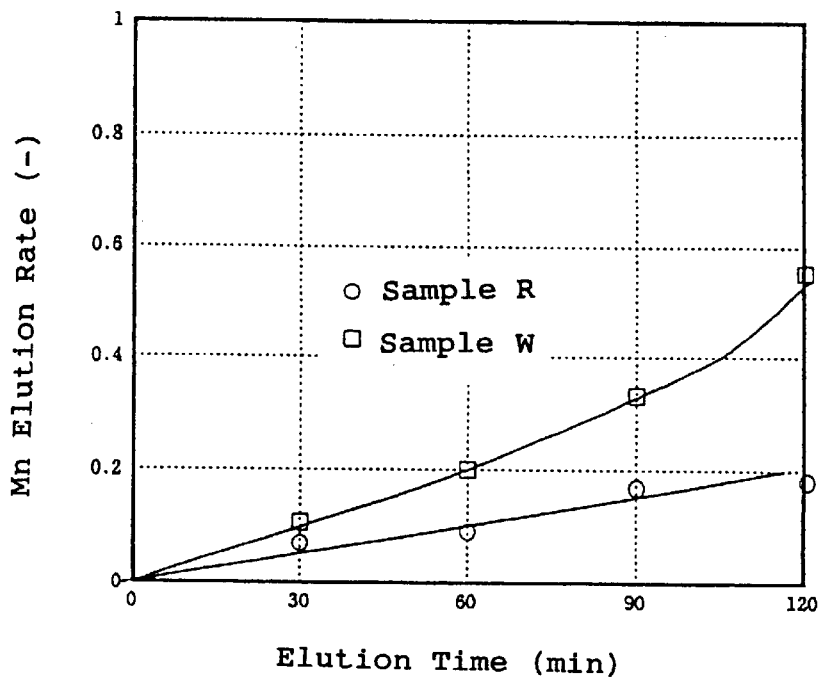
FIG. 3 is a graph showing relations between the elution time and the Mn elution rate.

Thirty grams of powdered sample was introduced into 100 ml of 0.1N aqueous solution of HCl and stirred. A small amount of slurry was sampled within the prescribed time, filtered quickly, and the Mn concentration (C mmol/l) in the filtrate was measured. FIG. 3 shows the results of the Mn elution characteristic test.

Hereupon, (amount of Mn eluted)=C×0.1 mmol, (Mn elution rate)=(amount of Mn eluted)/(initial Mn content).

As apparent from FIG. 3, in supporting Mn on amorphous titania, a Ti—Mn compound oxide is formed and Mn is not easily eluted. On the contrary, in supporting Mn on crystallized titania, forming compound does not proceed by baking at relatively low temperature, so that Mn is apt to be eluted.

Measurement of Amount of Acid

The sample X was checked for decrease in amount of acid by repeating temperature rise and temperature drop by the following procedure.

Figure 4:
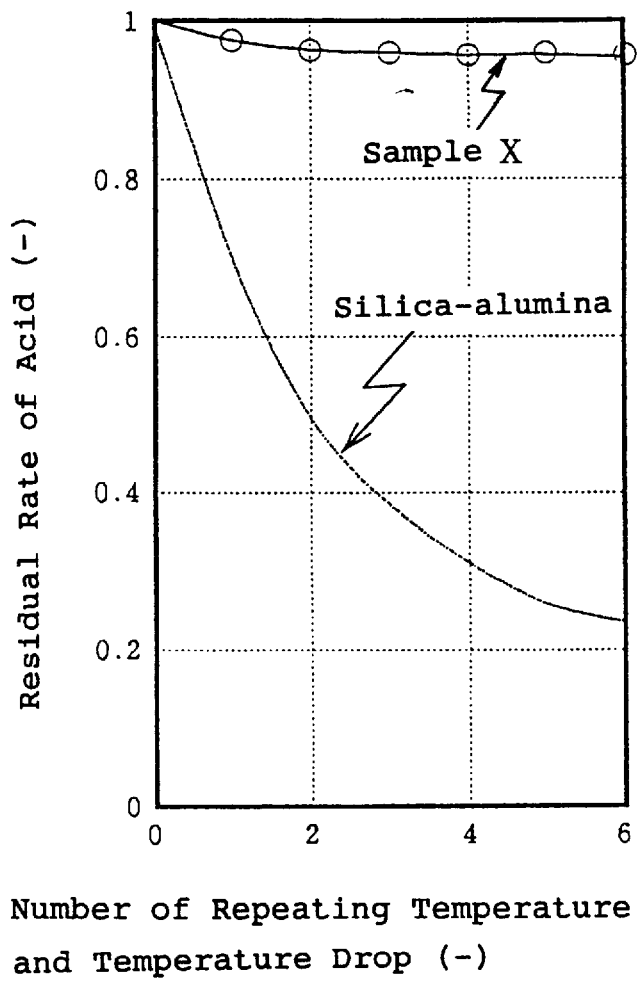
FIG. 4 is a graph showing relations between the number of repeating temperature rise and temperature drop and the residual rate of acid.

The sample X was exposed to air stream containing about 1,000 ppm of NO$_2$, temperature rise and temperature drop of room temperature –300° C. (respectively 2 hours) were repeated, and the variation in amount of solid acid by the action of acidic gas. This result is shown in FIG. 4. In FIG. 4, (acid residual rate)=(amount of acid)/(initial amount of acid).

As apparent from FIG. 4, silica-alumina initially exhibits a high amount of acid, but exhibits a markedly impaired amount of acid by the action of acidic gas. On the contrary, the carrier of the invention hardly exhibits an impaired amount of acid under the experimental condition.

What is claimed is:

1. An NOx adsorbent comprising adsorbing components supported on a titania carrier wherein said carrier is a Mn—Ti system surface-reformed titania carrier obtained by adding a Mn compound to amorphous titania and baking the titania and said adsorbing components are oxides of Ru and/or Ce.

2. An NOx adsorbent as defined in claim 1 wherein the amorphous titania is a plate obtained by impregnating an incombustible fibrous preform with a titania colloidal solution and drying the preform.

3. An NOx adsorbent as defined in claim 1 wherein the Mn content is 0.01–3.0 mmol/g $TiO_2$.

4. An NOx adsorbent as defined in claim 3 wherein the Mn content is 0.6–2.0 mmol/g $TiO_2$.

5. An NOx adsorbent as defined in claim 1 wherein the Ru content is 0.05–2.0 mmol/g $TiO_2$.

6. An NOx adsorbent as defined in claim 5 wherein the Ru content is 0.1–0.2 mmol/g $TiO_2$.

7. An NOx adsorbent as defined in claim 1 wherein the Ce content is 1.0–10 mmol/g $TiO_2$.

8. An NOx adsorbent as defined in claim 7 wherein the Ce content is 1.5–2.5 mmol/g $TiO_2$.

9. An NOx adsorbent as defined in claim 1 wherein the specific surface area of the carrier is 40–200 $m^2$/g $TiO_2$.

10. An NOx adsorbent as defined in claim 9 which has a specific surface area of 70–140 $m^2$/g $TiO_2$.

11. An NOx adsorbent as defined in claim 1 wherein said carrier is a metal-Ti system surface-reformed titania carrier obtained by adding the Mn compound and the second compound of at least one metal selected from the group consisting of Cu, Fe, Ni and Sn to amorphous titania and baking the titania.

12. An NOx adsorbent as defined in claim 1 which is obtained by impregnating amorphous titania with a solution of a manganese compound, baking the titania, and supporting the oxides of Ru and/or Ce on the obtained Mn—Ti system surface-reformed titania carrier.

13. An NOx adsorbent comprising adsorbing components supported on a titania carrier wherein said carrier is a Mn—Ti system surface-reformed titania carrier obtained by adding a Mn compound to amorphous titania and baking the titania, and said adsorbing components are oxides of Ru and Ce, and an oxide of at least one metal among Ag, Cu and Mn.

14. An NOx adsorbent as defined in claim 13 wherein said amorphous titania is a plate obtained by impregnating an incombustible fibrous preform with a titania colloidal solution and drying the preform.

15. An NOx adsorbent as defined in claim 13 wherein the Mn content is 0.01–3.0 mmol/g $TiO_2$.

16. An NOx adsorbent as defined in claim 15 wherein the Mn content is 0.6–2.0 mmol/g $TiO_2$.

17. An NOx adsorbent as defined in claim 13 wherein the Ru content is 0.05–2.0 mmol/g $TiO_2$.

18. An NOx adsorbent as defined in claim 17 wherein the Ru content is 0.1–0.2 mmol/g $TiO_2$.

19. An NOx adsorbent as defined in claim 13 wherein the Ce content is 1.0–10 mmol/g $TiO_2$.

20. An NOx adsorbent as defined in claim 19 wherein the Ce content is 1.5–2.5 mmol/g $TiO_2$.

21. An NOx adsorbent as defined in claim 13 wherein the content of at least one metal among Ag, Cu and Mn is 0.1–5.0 mmol/g $TiO_2$.

22. An NOx adsorbent as defined in claim 21 wherein the content of at least one metal among Ag, Cu and Mn is 0.3–2.5 mmol/g $TiO_2$.

23. An NOx adsorbent as defined in claim 13 which has a specific surface area of 40–200 $m^2$/g $TiO_2$.

24. An NOx adsorbent as defined in claim 23 which has a specific surface area of 70–140 $m^2$/g $TiO_2$.

25. An NOx adsorbent as defined in claim 13 wherein said carrier is a metal-Ti system surface-reformed titania carrier obtained by adding the Mn compound and the second compound of at least one metal selected from the group consisting of Cu, Fe, Ni and Sn to amorphous titania and baking the titania.

26. An NOx adsorbent as defined in claim 13 which is obtained by impregnating amorphous titania with a solution of the manganese compound, baking the titania, impregnating the obtained Mn—Ti system surface-reformed titania carrier with the solution of the oxides of Ru and Ce, and the oxide of at least one metal among Ag, Cu and Mn, and baking the carrier.

27. A Mn-added titania carrier obtained by adding a Mn compound to amorphous titania and baking the titania.

28. A Mn-added titania carrier as defined in claim 27 wherein the amorphous titania is a plate obtained by impregnating an incombustible fibrous preform with a titania colloidal solution and drying the preform.

29. A Mn-added titania carrier as defined in claim 27 wherein the Mn content is 0.01–3.0 mmol/g $TiO_2$.

30. A Mn-added titania carrier as defined in claim 29 wherein the Mn content is 0.6–2.0 mmol/g $TiO_2$.

31. A Mn-added titania carrier as defined in claim 27 wherein the specific surface area of the carrier is 40–200 $m^2$/g $TiO_2$.

32. A Mn-added titania carrier as defined in claim 31 wherein the specific surface area of the carrier is 70–140 $m^2$/g $TiO_2$.

33. A Mn-added titania carrier as defined in claim 27 which is produced by impregnating a substance obtained by evaporating a titania colloidal solution to dryness with a manganese salt solution and baking the substance.

\* \* \* \* \*